G. S. NEWSOM.
Subsoil Pulverizer.

No. 106,195.

Patented Aug. 9, 1870.

Witnesses

Inventor
G. S. Newson
PER
atty.

United States Patent Office.

GODFREY S. NEWSOM, OF NASHVILLE, TENNESSEE.

Letters Patent No. 106,195, dated August 9, 1870.

IMPROVEMENT IN SUBSOIL PULVERIZER.

The Schedule referred to in these Letters Patent and making part of the same

*To all whom it may concern:*

Be it known that I, GODFREY S. NEWSOM, of Nashville, in the county of Davidson and State of Tennessee, have invented a new and useful Improvement in Subsoil Pulverizers; and I do hereby declare that the following is a full, clear, and exact description thereof, which will enable others skilled in the art to make and use the same, reference being had to the accompanying drawing forming part of this specification.

Similar letters of reference indicate corresponding parts.

My invention relates to subsoil-plows, which cut and break the earth without turning it, and consists in the arrangement of a set of cutting-points and shanks on a rotary shaft.

A are the thills, the rear ends of which are attached to the axle B.

C are the drive-wheels, which revolve upon the journals of the axle B.

To the projecting ends of the axle B are pivoted the ends of the bars D, which are bent or curved, and in bearings in the angles or highest parts, and in the rear ends of which, work the shafts E F.

To one of the drive-wheels C is securely attached a large gear-wheel, G, the teeth of which mesh into the teeth of the small gear-wheel H, attached to the shaft E.

To the gear-wheel H is attached, or with it is securely connected, the large gear-wheel I, the teeth of which mesh into the teeth of the small gear-wheel J, attached to the shaft F.

Figure 1:
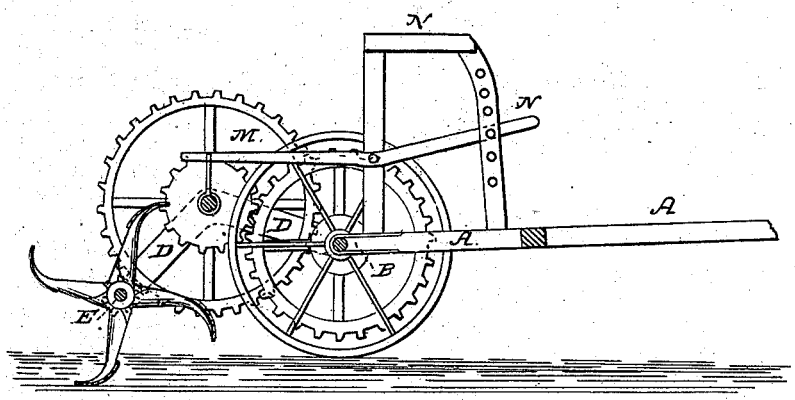
Figure 1 is a vertical longitudinal section of my improved subsoil pulverizer, taken through the line $x\ x$, fig. 2.
Figure 2:
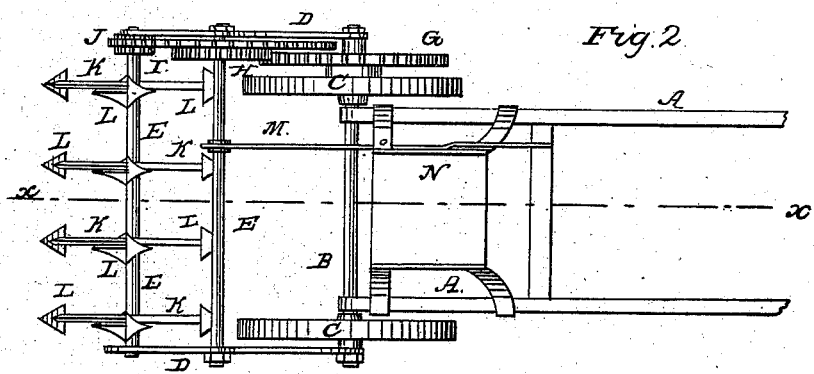
Figure 2 is a top view of the same.

To the shaft F are attached a series of curved radial arms, K, the forward or concave sides of which are beveled off, as shown in figs. 1 and 2, so that they may pass through the ground easily.

To the outer ends of the bars, arms, or knives K are securely attached the points or cutters L, by the action of which, as they pass through the ground, the soil is finely pulverized, the machine being so arranged that each cutter will operate upon the ground about an inch in front of the path of the preceding one.

M is a lever, the rear end of which is connected with the shaft F, and which is pivoted to one of the rear standards that support the seat N. The forward part of the lever M has a pin attached to it, which passes through one or the other of the holes in the forward standards that support the said seat, so that, by means of the lever M, the pulverizer may be adjusted to work at any desired depth in the ground, and may be raised and held away from the ground when required.

Having thus described my invention,

I claim as new and desire to secure by Letters Patent—

The arrangement, in a subsoil pulverizer, and on a rotating tool-stock thereof, of a series of triangular plow-points, L, sharpened on two sides, and shanks K, drawn to an edge on their front sides, all for the purpose of cutting and breaking up without turning the soil.

GODFREY S. NEWSOM.

Witnesses:

W. T. GLASGOW,
JESSE THOMAS.